United States Patent [19]
Sutton

[11] 3,949,174
[45] Apr. 6, 1976

[54] SYNCHRONIZED FREQUENCY TRANSPOSER
[76] Inventor: John F. Sutton, 4412 Greenwood Road, Beltsville, Md. 20705
[22] Filed: Sept. 11, 1974
[21] Appl. No.: 505,108

[52] U.S. Cl. .......................... 179/15.55 T; 179/1 SH
[51] Int. Cl.² ..................... H04B 1/66; G11B 15/20
[58] Field of Search .................. 179/15.55 T, 1 SH

[56] References Cited
UNITED STATES PATENTS
3,104,284   9/1963   French ........................ 179/15.55 T
3,846,827   11/1974  Eppler ........................ 179/15.55 T
3,855,424   12/1975  Tharmaratnam ............. 179/15.55 T OTHER PUBLICATIONS
Stover W., "Time Domain Bandwidth Compressor System", J. of Acc. Soc. of Am., p. 348, Vol. 42, Mar. 2, 1967.

Primary Examiner—Kathleen H. Claffy
Assistant Examiner—E. S. Kemeny
Attorney, Agent, or Firm—R. F. Sandler; Nina M. Lawrence; John R. Manning

[57] ABSTRACT

In a time base transposer for an analog signal, samples of whole cycles of the signal are serially loaded into a plurality of analog signal storage means, e.g., charge coupled shift registers, at a first rate and are serially unloaded at a second rate. Timing pulses supplied to the storage means are synchronized to zero crossover points of the analog signals and have a repetition rate which is an integral multiple of the frequency of the analog signal. When the transposer is operated as a time base expander, the stored samples are unloaded from the storage means at a rate lower than the loading rate and leftover whole cycles are discarded. When the transposer is operated as a time base compressor, the stored samples are recirculated in the storage means to duplicate whole cycles of the analog signal before being unloaded at a rate higher than the loading rate.

28 Claims, 9 Drawing Figures

3,949,174

SYNCHRONIZED FREQUENCY TRANSPOSER

ORIGIN OF THE INVENTION

The invention described herein was made by an employee of the United States Government and may be manufactured and used by or for the Government for governmental purposes without the payment of any royalties thereon or therefor.

FIELD OF THE INVENTION

The present invention relates generally to a system for transposing the time base of an analog signal and more particularly to such a system including means synchronized to the zero cross-over points of the analog signal for controlling the loading and unloading of the samples.

BACKGROUND OF THE INVENTION

In the prior art, a number of techniques are commonly employed to compress or expand the time base of analog signals such as speech. In one system, speech is recorded on a dynamic medium moving at one speed and played back with the medium moving at a rate higher or lower than the recording rate, whereby all the frequency components of speech are proportionally changed. This system has the disadvantage of causing played back speech to have a different pitch from the recorded speech, with distortion frequently resulting.

In another prior art system for expanding the time base of an analog signal, the analog signal is applied to a harmonic compressor which contains a plurality of bandpass filters to separate the signal into the frequency components thereof. The output of each filter is applied to a frequency divider circuit and thence to a circuit for reducing any distortion in the different frequency components. Although the described system performs satisfactorily, the bank of bandpass filters, in addition to the signal conditioning circuitry, is bulky and expensive, and therefore it is not practical for many applications.

In another prior art time base expanding system, the the analog signal is sampled and the samples are converted into a digital signal that is loaded into a digital shift register at a first rate. When the register is full, the digital signals are unloaded therefrom at a second rate lower than the first rate, and the samples are then reconstructed into an analog signal using a digital-to-analog converter. For compressing the time base of an analog signal, digitally encoded samples of the analog signal are recirculated in digital registers before being unloaded at a rate higher than the first rate. While generally satisfactory, one difficulty with the described systems is the relatively high cost of analog-to-digital and digital-to-analog converters. In addition, in any time base transposer utilizing sampling and storing of the analog signal, in order to avoid distortion during signal reconstruction, it is advantageous to store whole cycles of the analog waveform by synchronizing the sampling of the analog waveform to the zero cross-over points thereof. Prior art transposer synchronization required complex circuitry which is not practical for consumer and general applications requiring low cost.

BRIEF DESCRIPTION OF THE INVENTION

In accordance with the present invention, expansion and compression of the time base of an analog signal is attained by loading an integral number of samples of each cycle of the signal into an analog shift register means, e.g., charge coupled shift register, at a first rate and unloading the samples from the register at a second rate. A low cost timing circuit, such as a phase locked loop or a fixed frequency pulse generator that is gated during alternate whole cycles of the analog signal, synchronizes the loading and unloading of the analog shift register. Preferably, zero cross-over points of the analog signal are detected to control synchronization. The time base of the analog signal is expanded by sampling and storing whole cycles thereof at one rate and discarding certain of the cycles before combining the remaining undiscarded cycles at a lower rate. Alternatively, the time base of the analog signal is compressed by sampling and storing whole cycles thereof at one rate and recirculating the stored cycles in the storage means for whole cycle duplication before recombining the cycles at a higher rate. Because samples representing whole cycles are stored in the analog shift register and recombined at the zero cross-over points under the control of the timing circuit, analog-digital-analog conversions are obviated and both signal distortion and cost are minimized.

In order to establish synchronization for random wide band frequency variations of the analog signal, as subsist with speech, synchronization is attained with a phase locked loop responsive to a wave having transitions synchronized with a unique detectable event during each period of the analog source. The phase locked loop is of the wide band type having a sample and hold phase detector which provides a pulse having a width that is proportional to the time displacement between the leading or trailing edges of an input signal and internally generated oscillator signal. In order to prevent over-tracking of "hunting" at low input signal frequencies by the loop, an anti-log amplifier is used to convert the error signal during transient conditions from a time basis to a percent frequency error basis.

OBJECT OF THE INVENTION

Accordingly, one object of the present invention is to provide a new and improved time base transposer.

Another object of the present invention is to provide a new and improved time base transposer which operates entirely in the analog domain.

Yet another object of the present invention is to provide a new and improved time base transposer which is capable of either compressing or expanding the time base of a waveform by any integer or ratio of intergers factor.

Still another object of the present invention is to provide a new and improved time base transposer which expands the time base of an analog waveform by sampling and storing whole cycles at one rate and discarding certain of the cycles before recombining the remaining cycles at a rate lower than the loading rate.

An additional object of the present invention is to provide a new and improved time base transposer which compresses the time base of an analog waveform by sampling and storing whole cycles at one rate and recirculating the cycles before recombining the cycles at a rate higher than the loading rate.

Still another object of the present invention is to provide a new and improved time base transposer which samples the analog waveform under control of a timer synchronized to the zero cross-over point of the waveform.

Yet another object of the present invention is to provide a new and improved time base transposer which is accurate and yet inexpensive.

An additional object is to provide a new and improved time base transposer wherein synchronizing signals are derived once each cycle of an analog input signal that has a frequency which may randomly vary over an extremely wide band.

A further object of the invention is to provide a new and improved phase locked loop including a wide band type voltage controlled oscillator driven by a sample and hold phase detector that operates over a five decade frequency range without bandswitching and yet develops an error voltage which is a function of percent frequency error between an input signal and the output of the oscillator whereby hunting of the loop with a low frequency input signal is eliminated.

The above and still further objects, features and advantages of the present invention will become apparent upon consideration of the following detailed description of several specific embodiments thereof, especially when taken in conjunction with the accompanying drawing.

DETAILED DESCRIPTION OF THE DRAWING

Figure 1A:
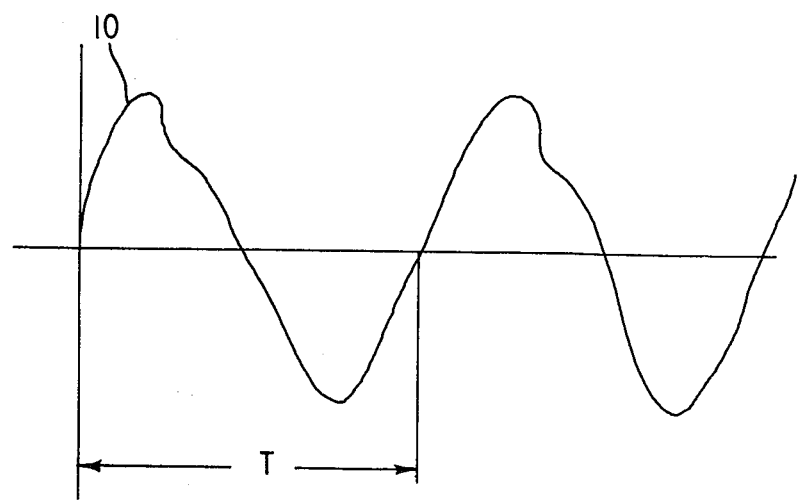
FIGS. 1A–1D are illustrations of waveforms helpful in describing the operation of the embodiments of the present invention.

Referring to FIG. 1A, an analog waveform 10 is quasi-sinusoidal in shape having a period T. The waveform 10 may be a speech waveform but is generally any analog signal having a variable, unpredictable frequency ($f = 1/t$) within a predetermined range.

Figure 1B:
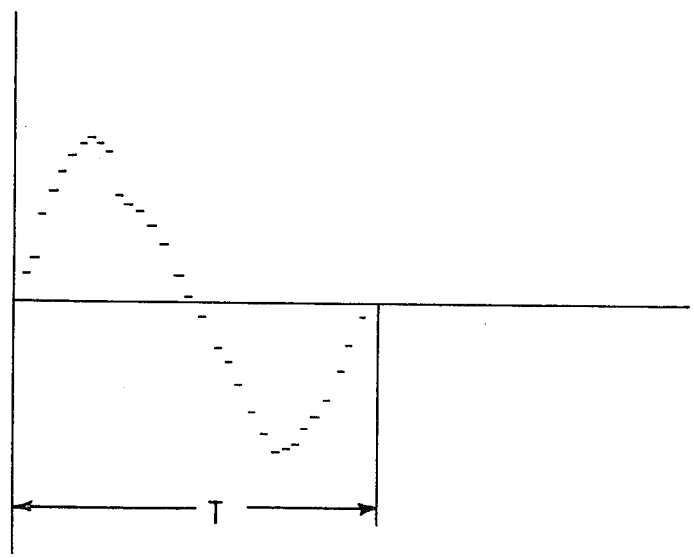
Figure 1C:
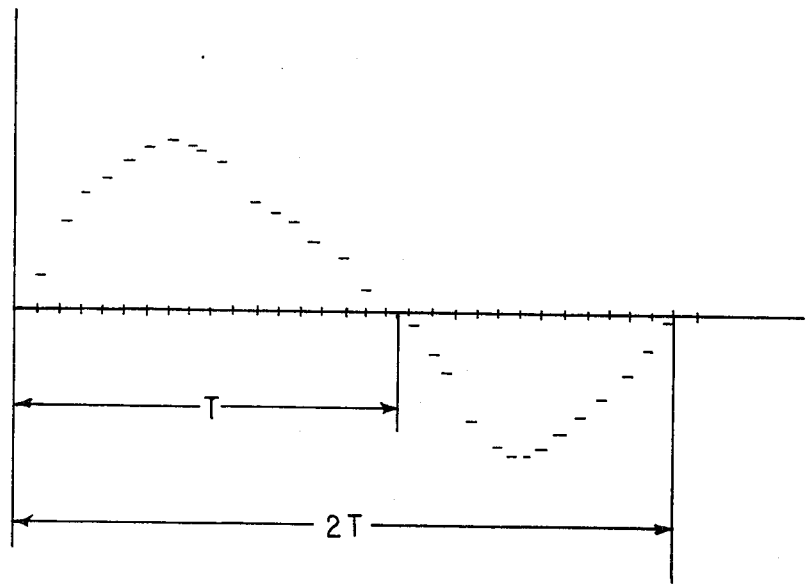

In FIG. 1B, each cycle of waveform 10 is sampled at a rate of 32 samples per period and serially loaded into an analog storage means, e.g., an analog shift register containing 32 stages. To expand the time base of waveform 10, the stored samples are serially unloaded from the analog shift register at a rate lower than 32 samples per period. For example, when a time base expansion by a factor of two is desired, the samples are unloaded from the register at a rate which is one-half that at which they were loaded, i.e., 16 samples per period. The resulting output waveform 12 shown in FIG. 1C is a substantial duplicate of the input waveform shown in FIG. 1A, but has a period 2T. Since in this example two cycles of waveform 10 are loaded into the analog shift register during the time one expanded cycle is being unloaded, two analog shift registers are required. Two cycles of the waveform are loaded into one register at the higher sampling rate, but only the second of the two cycles is stored in the register, the first cycle passing completely through the register. Simultaneously, the previously stored cycle is unloaded from the other register at the lower rate of 16 samples per cycle. Thus, cycles are alternately unloaded from the two analog registers to produce an undistorted time base expanded analog waveform.

When the frequency transposer is used as a time base compressor to compress the time base of an analog waveform by a factor of two, for example, each of a pair of analog shift registers contains a feedback loop which causes the stored samples of a cycle of the waveform to recirculate back to the input of the shift register before being unloaded. The shift register is unloaded at a rate which is twice the loading rate, i.e., 64 samples per period, and due to the feedback, each cycle is duplicated to produce the undistorted compressed output waveform 14 shown in FIG. 1D.

Figure 2:
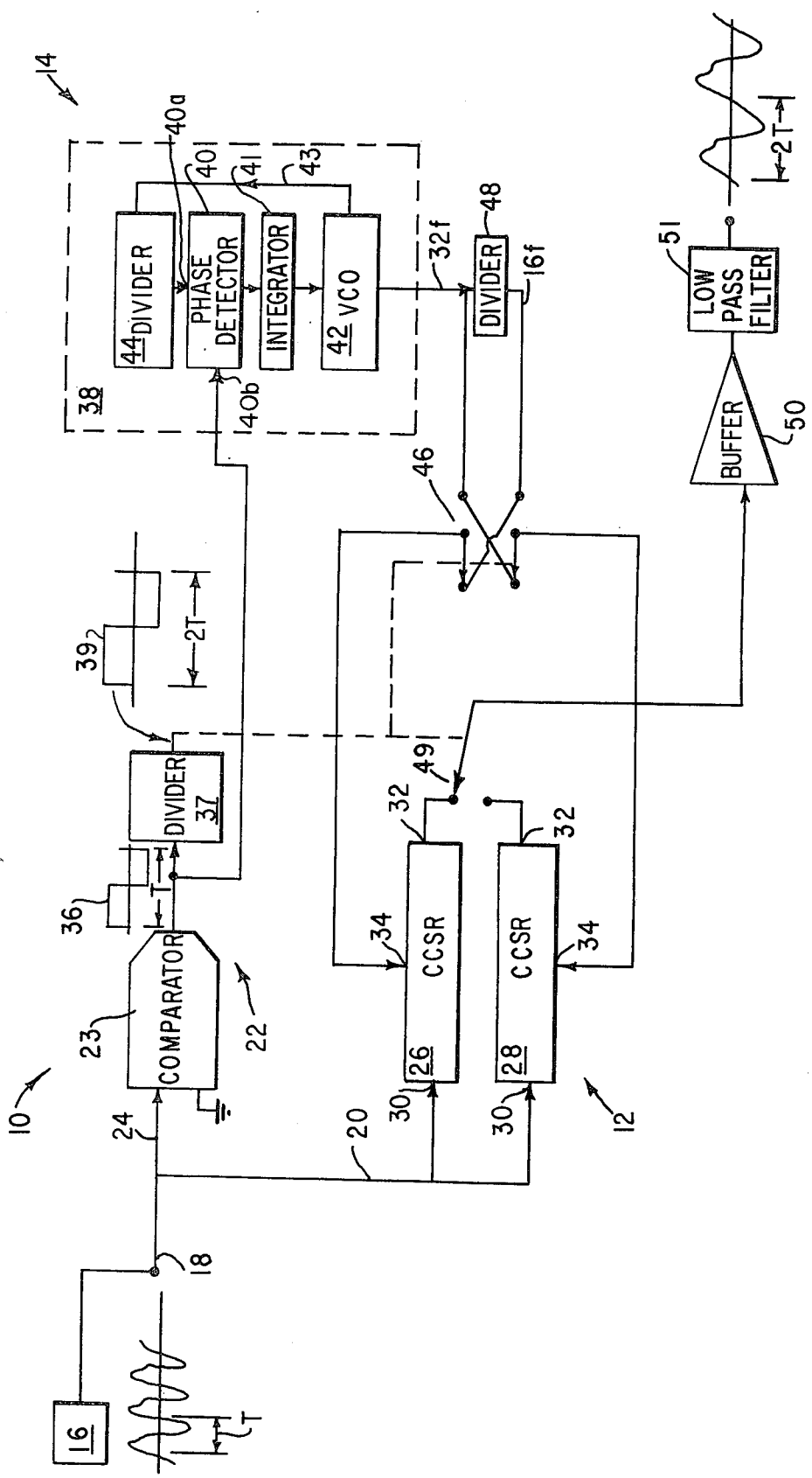
FIG. 2 is a block diagram of one embodiment of a time base transposer according to the present invention.

Referring to FIG. 2, one preferred embodiment of the invention is shown which functions to expand the time base of an analog signal 16 by a factor of two.

The frequency transposer 10 comprises three basic sections, i.e., an analog waveform storage section 12, an input waveform synchronized timing section 14 and a zero cross-over detector 22 for detecting a particular characteristic of the waveform from source 16 to generate a pulse once each cycle of the waveform. Basically, the system 10 functions so that pulses are supplied by detector 22 to timing section 14 which derives a pair of variable frequency output timing pulse trains, each of which is a predetermined integral multiple of the frequency of source 16, and one of which is an integral multiple of the other. During each period of source 16, one of the pulse trains is supplied by timing section 14 to one of analog shift registers 26 and 28, included in waveform storage section 12, and the other pulse train is supplied to the other shift register. Shift registers 26 and 28 are responsive to the analog signal of source 12, and in response to each pulse of the timing pulse train applied to it, take a sample of the analog signal and shift a previously stored analog sample one stage in the register. During alternate cycles of the signal of source 16, shift registers 26 and 28 are alternately responsive to the two timing pulse trains. While one of the shift registers 26 or 28 is responsive to the lower frequency timing pulse train, an output terminal thereof is connected to an output switch. Simultaneously, the other analog shift register is activated by the higher frequency timing wave train and is not connected to an output switch. Thereby, the shift register responsive to the higher frequency timing pulse train is loaded with samples from one cycle of source 16, while the other shift register is unloaded with samples taken during the previous cycle of source 16. By suitably arranging the relative frequencies of the two timing wave trains supplied by section 14 to section 12, the number of samples derived from each of shift registers 26 and 28 can be controlled so that it is an integral multiple or integral division factor of the number of samples. To enable the number of samples to be an integral multiple of the number of samples taken over a cycle, each of registers 26 and 28 is of the feedback, recirculating type.

Analog shift registers 26 and 28 of analog waveform storage section 12 are preferably charge coupled shift registers (CCSR), such as the M—31 CCSR manufactured by Amperex Electronic Corporation. Each of registers 26 and 28 contains input, output and clock terminals 30, 32 and 34, and is similar in function to a digital shift register insofar as samples are stored therein and shifted each time a pulse is applied to the clock terminal. However, unlike a digital shift register, when an analog waveform is applied to the input terminal while the clock terminal is pulsed, variable amplitude analog samples of the signal are serially stored in the CCSR without analog-to-digital conversion. A 32 stage shift register has been used by way of example because it is presently commercially available. However, any number of stages could be used within the spirit of the invention, for example, by connecting any number of 32 stage CCSRs in tandem.

If the input signal is removed from terminal 30 when the CCSR is fully loaded and additional clock pulses are applied to clock terminal 34, the CCSR serially unloads one sample at a time to terminal 32. If a single cycle of the analog signal is to fill a CCSR having 32 stages, a timing source must be provided to apply 32 clock pulses to the CCSR during the duration of the cycle.

The timing pulses are provided by the timing section 14 which is synchronized to an easily detectable portion of each cycle of the analog signal, e.g., the positive peak, or a positive going zero cross-over; in the FIG. 2 embodiment, the positive going zero cross-over is sensed by zero cross-over detector 22 that includes comparator 23 which drives divide-by-two frequency divider 37. Comparator 23 is responsive to the input signal from source 16 and includes a grounded reference terminal so that it generates a square wave synchronizing waveform 36 having leading and trailing edges, respectively coinciding with the positive and negative going zero cross-over points of the analog signal from source 16 which may be a speech source. The waveform 36 activates divide-by-two circuit 37, which may, for example, be a trigger flip-flop, to produce a square wave 39 having a period 2T with leading and trailing edges in time coincidence with positive going cross-over points of signal source 16. The square wave 39 is used to synchronize the timing section 14 to the positive going zero cross-over points of the signal from source 16.

The output of comparator 23, besides being connected to the divider circuit 37, is applied to the timing section 14. The timing section 14, in one preferred embodiment of the invention, includes a second order phase locked loop 38, which comprises phase detector 40 that produces a D.C. output voltage amplitude which has an amplitude and polarity indicative of the difference in phase between the voltages applied to its two inputs 40a and 40b. The output voltage of phase detector 40 is applied to a filter or integrator 41, which drives a voltage controlled oscillator (VCO) 42 that oscillates to generate a timing signal having a frequency which is a function of the magnitude of the applied voltage. In order to lock VCO 42 to the square wave 36 and produce a timing signal having a frequency 32 times that of the square wave 36, the output of VCO 42 is applied to an input of a divide-by-32 frequency divider or counter 44 which derives a square wave output that is supplied to input 40a of phase detector 40.

Assuming that the output of the VCO 42 is synchronized initially to the waveform 36, the output voltage of phase detector 40 becomes $V_o$ and the VCO 42 oscillates at a predetermined quiescent frequency. In response to a change in the frequency of the synchronizing waveform 36, a phase error between the synchronizing waveform 36 and the output of VCO 42 (through divider 44) is detected by the phase detector 40 which responds thereto with a change in output voltage. The change in the output voltage of phase detector 40 causes VCO 42 to become re-synchronized to the waveform 36. It is understood that if the divider 44 were removed from the phase locked loop 38, the phase locked loop would lock to and oscillate at the same frequency as the synchronizing waveform 36. However, by providing the divide-by-32 circuit 44 in the feedback loop, the output of VCO 42 is synchronized to the zero crossover points of the waveform source 16 at a frequency which is 32 times that of the waveform 36. The factor 32 corresponds to the 32 stages contained in each of the CCSRs; however, it is understood that, in general, a divide-by-m counter is used in the feedback path 43 of the phase locked loop 38 to cooperate with a CCSR having m stages.

The output of the phase locked loop 38 at a frequency of $mf$, where $f=1/T$ and $T$ is the period of 1 cycle of the signal of source 16, is applied to a divide-by-two frequency divider 48, such as a trigger flip-flop, to provide a second timing signal at a frequency of $mf/2$. The two timing signals, having frequencies $32f$ and $16f$ (in the particular embodiment) are applied to CCSRs 26 and 28 through reversing switch 46 (shown for convenience as a mechanical switch). Switch 46 is controlled by the square wave 39 and applies the higher frequency timing signal (i.e., the signal of frequency $32f$) to one CCSR for loading the analog waveform while switch 49, synchronized to the switch 46, connects buffer amplifier 50 to the output of the particular CCSR being unloaded. For example, with switches 46 and 49 in the positions shown in FIG. 2, CCSR 28 is loaded with one cycle of the waveform 16 at the higher frequency timing signal ($32f$) generated by VCO 42 while the content of CCSR is unloaded to buffer 50 through the switch 49 at the lower frequency timing signal ($16f$) generated by divider 48. At the end of a period $2T$, determined by the synchronizing waveform 39, switches 46 and 49 are switched from the illustrated condition to respectively load the CCSR 26 at the rate $mf$ and unload the CCSR 28 at the $m/2f$. Amplifier 50 drives low pass filter 51 to provide smooth transitions in the discrete stair step shifts of the waveform derived from the CCSR which is connected to switch 49. The stair step shifts occur as a result of the sampling storage and shifting operations in the CCSR's. Filter 51 derives an analog waveform that is a time base expanded or compressed replica of the waveform of source 16, as illustrated in FIGS. 1 and 2.

In operation, the analog waveform from source 16 is applied to the input terminal 18 where the waveform is applied to both the zero cross-over detector 22 and the storage section 12. With the switches 46 and 49 in the positions shown in FIG. 2, CCSR 28 is loaded at a rate controlled by the higher frequency ($32f$) timing signal produced by the voltage controlled oscillator 42. Simultaneously, CCSR 26 is unloaded into buffer amplifier 50 through switch 49 at the lower frequency ($16f$) equal to the frequency of the timing signal from divider 48. Since CCSR 26 is unloaded at half the rate at which the CCSR is loaded, in the embodiment of FIG. 2, two complete ccles of waveform 16 pass through CCSR 28 in the period $2T$ while one cycle is being unloaded from CCSR. 26. Since the 32 stage CCSR 28 has a capacity to store only one cycle of the waveform of source 16 at 32 samples per cycle, only the second of each 2 cycles of the waveform loaded into CCSR 28 is stored therein, the first cycle passing completely through and out of the CCSR. At the end of the period 2T, under control of the square wave 39, switches 46 and 49 change state to unload the samples of one cycle of the waveform stored in CCSR 28 at the frequency 16$f$ and load CCSR 27 at the frequency 32$f$. Although every other cycle of the waveform loaded in the storage section 14 is lost, no discontinuity exists in the output signal at the buffer 50 during unloading because both the loading and unloading are synchronized to the zero cross-over points of the waveform.

While the circuit described expands the time base of an input waveform by a factor of two, the same basic system can be modified to expand the time base of an analog waveform by any other integer (or ratio of intergers) value $n$, $n$ 2, by loading $n$ CCSR's at a rate $mf$ and unloading one CCSR at a time at a rate $mf/n$, where $m$ is the number of stages in each CCSR and $f = 1/T$ is the instantaneous frequency of the analog waveform. A divide-by-$m$ circuit is connected in the feedback path of the phase locked loop 38 to develop the loading signal at frequency $mf$ and a divide-by-$n$ circuit connected to the phase locked loop develops the unloading timing signal at frequency $mf/n$. Switches 46 and 49 are adapted with regard to the number of contacts to sequentially unload the CCSR's one at a time at the lower rate. In practice, it has been found that for speech signals, a time base expansion by a factor up to 3 is practical but that serious degradation of the speech waveform 16 occurs with higher time base expansion.

Figure 1D:
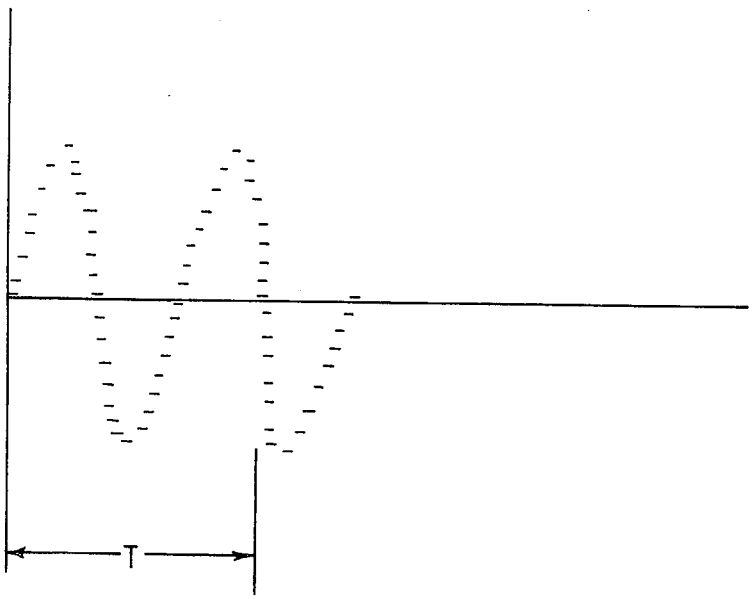
Figure 3:
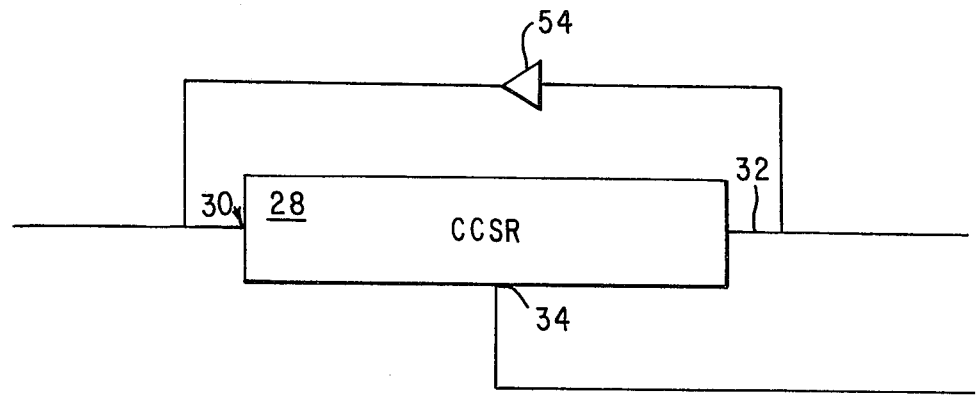
FIG. 3 is a circuit diagram of an analog shift register having feedback for compressing the time base of an analog signal in the transposer of FIG. 2.

As another preferred embodiment, the time base transposer 10 operates to compress the time base of an analog waveform when a feedback loop is provided around each CCSR as shown in FIG. 3 and the order of inputs to the switch 48 is reversed. In FIG. 3, a feedback circuit is connected between output 32 and input 30 of CCSR 28 to recirculate the samples stored in the CCSR. An amplifier 54 is connected in the feedback loop to reshape the stored samples which suffer some degradation as they propagate through CCSR 28. To compress the time base of the waveform 16 in the transposer 10 by a factor of two, for example, the CCSR's in FIG. 2, incorporating feedback as shown in FIG. 3, are unloaded at a rate twice that at which they are loaded. Since a whole cycle of the waveform 16 is unloaded in a period $T/2$, the cycle being recirculated through CCSR 28 follows the cycle being unloaded so that two identical cycles, together extending over a period T, as in FIG. 1D, are unloaded. The switch 49 is connected to the CCSR being unloaded under control of the output of the divider 37.

Generalizing the system, the analog waveform 16 can be compressed by any integer factor $n$, $n>1$, by loading $n$, $m$ stage CCSR's each having the feedback connection of FIG. 3 at a rate $mf$ and sequentially unloading one CCSR at a time at a rate $mnf$.

Figure 4:
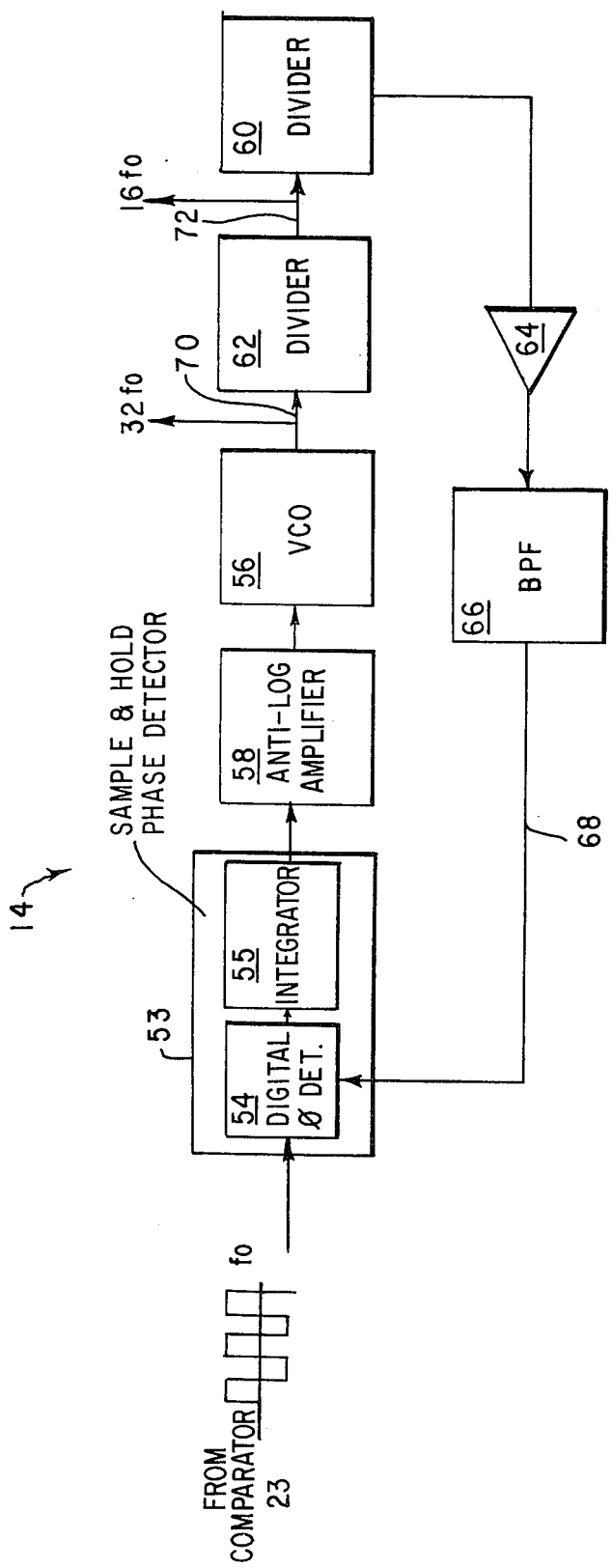
FIG. 4 is a block diagram of a wide band phase locked loop used as the timing section in the transposer.

The timing section 14 must be wideband in practical applications, such as speech waveform processing where the tracking of signals having frequencies which vary as much as three decades is required. One circuit which is particularly suitable as the timing section 14 for wideband applications is shown in FIG. 4 wherein a second order phase locked loop comprises sample and hold phase detector section 53 having a digital phase detector 54 and integrator 55 responsive to the output of comparator 23. Detector 54 applies to integrator 55 a pulse having a width proportional to the duration of the time between signal peaks applied to the detector input terminals. Output of integrator 55 is applied to a wideband type voltage controlled oscillator 56 through an anit-log amplifier 58. The output of voltage controlled oscillator 56 is connected to a divide-by-two frequency divider 60 connected in tandem with a divide-by-16 frequency divider 62. The output of divider 62 is fed back to sample and hold detector 54 through amplifier 64 and a bandpass filter 66. Filter 66 eliminates extremely high and low frequency components in the loop which are outside the tracking range of the loop and cause the loop to lock onto a harmonic or subharmonic frequency of the input waveform. These components are derived from the square wave signal generated by VCO 56. The filter 66 includes a pulse shaping network at the output thereof to generate a clean square wave signal to one input of detector 53. When an input signal from comparator 23 having a frequency $f_0$ is applied to the phase detector section 53, timing signals are provided at terminals 70 and 72 having frequencies $32f_0$ and $16f_0$, respectively. A sample and hold phase detector of the type described is known and discussed in Schowe, Jr., *Electronic Design* 18, Sept. 1, 1973, on pages 112–116.

The phase locked loop having the sample and hold phase detector is capable of extremely wideband operation, i.e., five decades without band switching. However, because the sample and hold phase detector 53 produces a pulse having a width which is proportional to the time difference between the leading or trailing edges of the input signal and VCO signal, overtracking or "hunting" during transient operation when the loop is locking onto a relatively low frequency input signal is observed. In order to obviate hunting of the loop at low frequencies, I have provided anti-log amplifier 58 which converts the error signal from sample and hold detector 53 from a time basis to a percent frequency basis during transient operation of the loop. The percent frequency error signal developed by anti-log simplifier 58 is applied to control VCO 56.

The phase locked loop of FIG. 4 operates over a five decade frequency band without band switching and with minimum low frequency hunting. The timing signals developed at outputs 70 and 72 are supplied to the clock terminals 34 of the CCSR's 26 and 28 in FIG. 2.

Figure 5:
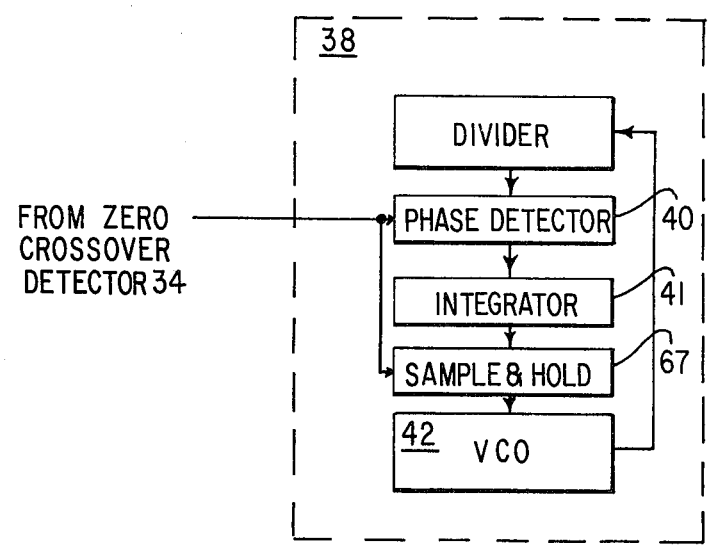
FIG. 5 is a circuit diagram of a modification of the phase locked loop of FIG. 2.

I have found that when the frequency of the input signal changes rapidly, resulting in the period $T$ between adjacent cycles being significantly different, some distortion of the output waveform results because the timing with which a CCSR is unloaded is not quite synchronized to the signal earlier loaded therein. An improvement to the transposer to obviate the distortion is to include a sample and hold circuit in the phase locked loop 38 of FIG. 2 to "remember" the period of a loaded cycle of the input signal until it is subsequently unloaded from a CCSR. For example, in FIG. 5, a sample and hold circuit 67 is connected to the output of the integrator 41 to store the VCO 42 control voltage for the duration of storage of the input signal in the CCSR's. The sample and hold circuit 67 causes the control voltage to be applied to VCO 42 one cycle late under control of the output of comparator 23 to insure that any change in the frequency of waveform 16 while a cycle is stored in storage section 12 will not produce shift of the base line of the output waveform.

As an alternative to the phase locked loop circuit of FIG. 4, another circuit using a voltage controlled oscillator to produce timing signals synchronized to the input waveform is applied to comparator 70 that functions as a zero cross-over detector in the same manner as comparator 23. Comparator 70 derives an output which is a bilevel signal applied through divide-by-two frequency divider 72 to an enable input of a gate 74. Applied to the other input of the gate 74 are pulses 77 produced by a constant repetition rate pulse generator (clock source) 76. While a binary one is derived from divider 72, gate 74 derives a pulse train 75 having a pulse repetition rate equal to that of the generator 76, with the number of pulses in each train corresponding to the cycle length T of each cycle of the input signal. No trains are derived from gate 74 during alternate cycles of the waveform of source 16, since a binary zero is at that time applied by divider 72 to gate 74.

Figure 6:
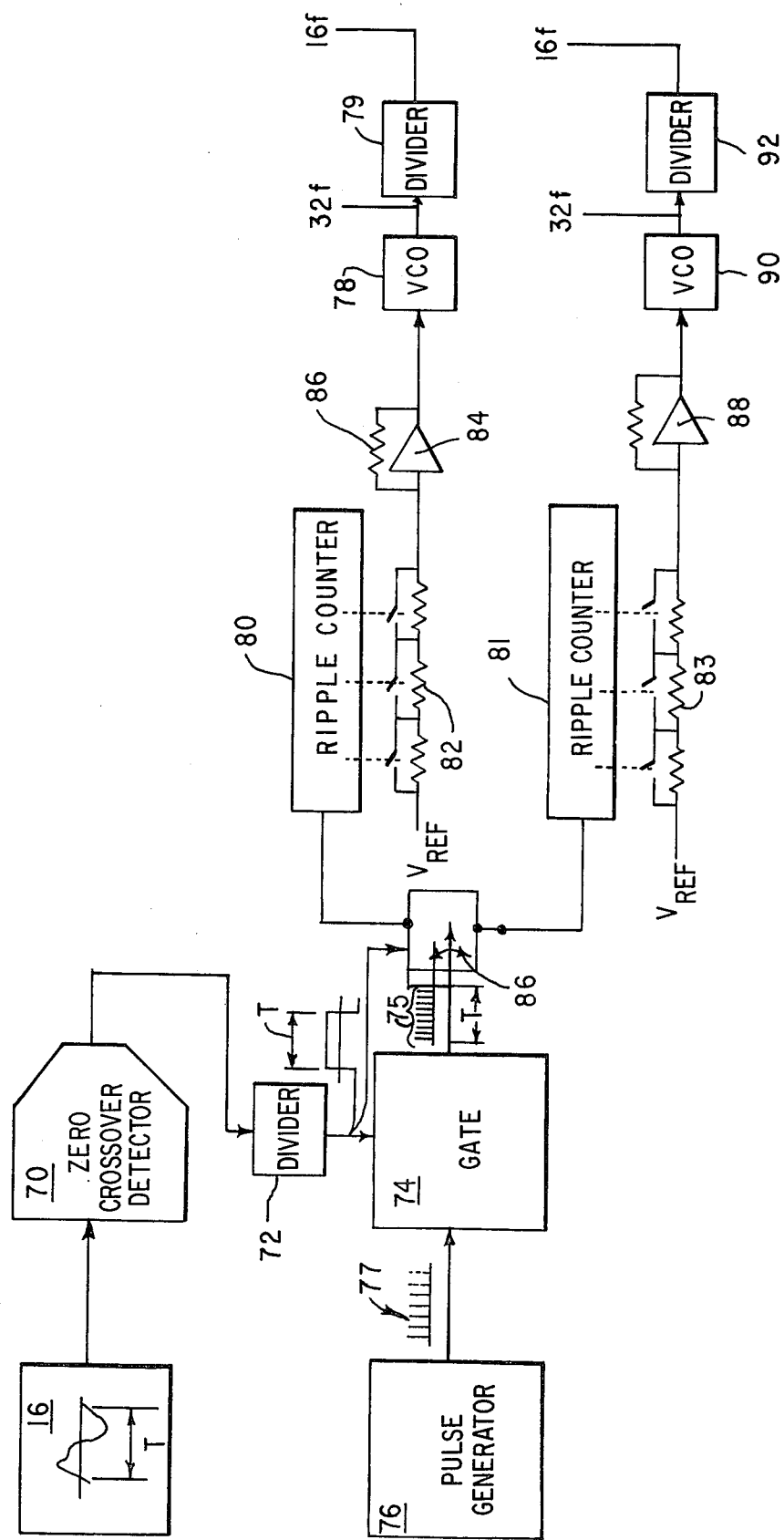
FIG. 6 is a block diagram of a digital timing circuit used as an alternative to the phase locked loop.

In the present example, using two 32 stage CCSR's, the frequency of the timing circuit is required to be 32 times that of the input waveform of source 16. In the circuit of FIG. 6, since the number of pulses in each pulse train 75 is proportional to the width of one cycle of the input waveform, the control voltage applied to a voltage controlled oscillator 78 is a function of the number of pulses per pulse train 75 from gate 74. To produce the required control voltage, the output of the gate 74 is selectively applied through switch 86 to one of ripple counters 80 and 81. The counts of ripple counters 80 and 81 respectively control the values of variable input resistors 82 and 83 of D.C. operations amplifiers 84 and 88, having fixed feedback resistors 86. Amplifiers 84 and 88 are responsive to fixed D.C. reference voltages so that the amplifier output voltages are inversely proportional to the values of the input resistors thereof. The gains of operational amplifiers 84 and 88 are controlled by forming the input resistors 82 and 83 as series connected resistors that are shorted in response to the counts stored in counters 80 and 81. Thereby, the voltages derived from amplifiers 84 and 88 are directly proportional to the instantaneous frequency of the cycle of source 16 which caused pulse train 75 to be loaded into counter 80 or 81.

It has been found that the circuit of FIG. 4 produces very nearly thirty-two pulses per cycle period. The maximum error observed using the circuit of FIG. 6, due to the inaccuracy of the VCO's 78 and 90, is two pulses per cycle which has an effect of slightly shifting the base line of the output of the frequency transposer 10. Of course, if desired, a more expensive frequency synthesizer can be used in place of the VCO's. However, for most applications, limited base line shifting is not objectionable.

While there have been described and illustrated several specific embodiments of the invention, it will be clear that variations in the details of the embodiments specifically illustrated and described may be made without departing from the true spirit and scope of the invention as defined in the appended claims.

What is claimed is:

1. An apparatus for expanding or compressing the time base of an analog signal susceptible to random frequency variations by an integer factor of $n$, $n>1$, said signal having a frequency $f$ comprising:

analog storage means including $m$ stages for storing and shifting $m$ samples of said signal;
   means for loading and unloading said analog storage means with only whole cycles of said signal, including:
   a. means responsive to a recurring portion of said signal for generating a first timing signal having a frequency $mf$ and a second timing signal having a frequency $mf/n$;
   b. means for serially loading said storage means at a first rate corresponding to one of said timing signals; and
   c. means for serially unloading said storage means at a second rate corresponding to the other of said timing signals; and
   means for reconstructing said unloaded signal to form a processed analog signal having a time base different from that of said analog signal.

2. The apparatus of claim 1 wherein said timing signal generating means includes a phase locked loop synchronized to said analog signal, said first timing signal being an output of said phase locked loop.

3. The apparatus of claim 2 further including divider means connected to said phase locked loop for generating said second timing signal.

4. The apparatus of claim 1 wherein said means for generating a first timing signal includes a zero crossover detector circuit.

5. The apparatus of claim 2 wherein said phase locked loop includes a feedback circuit and a divide-by-$m$ circuit connected in said feedback circuit.

6. The apparatus of claim 2 wherein said phase locked loop includes a phase detector and a voltage controlled oscillator, said detector responsive to an input signal and an output signal of said oscillator and providing an absolute time basis error signal, and said loop further includes an anti-log amplifier connected between said phase detector and said controlled oscillator to provide a percentage frequency error signal to control said voltage controlled oscillator.

7. The apparatus of claim 5 wherein said phase locked loop further includes a delay means in said feedback loop for delaying a voltage indicative of the period of a cycle of said signal loaded in said analog storage means until said cycle is unloaded therefrom.

8. The apparatus of claim 1 wherein said analog storage means includes at least one charge coupled shift register.

9. The apparatus of claim 1 wherein said timing signal generating means includes:
   a fixed repetition rate pulse generator;
   means for generating a pulse train having a number of pulses corresponding to the period of a cycle of said analog signal;
   means for converting said pulse train into a control voltage proportional to the number of pulses in said train; and
   an oscillator connected to said converting means to produce said first timing signal, the frequency of said oscillator being controlled by said control voltage.

10. The apparatus of claim 9 wherein said timing signal generating means further includes a divider circuit connected to said oscillator for deriving said second timing signal.

11. An apparatus for expanding by a factor of two the time base of a substantially repetitive analog signal having a frequency $f$ and susceptible of random frequency variations comprising:
   an input terminal for receiving said analog signal;
   first and second analog devices for serially storing and shifting $m$ samples of only one integral cycle of said analog signal, each of said devices including $m$ storage stages;

means for loading and unloading said devices with only single integral cycles including:
  a. means synchronized to a recurring portion of said analog signal for generating a first timing signal having a frequency $f'$ and a second timing signal having a frequency $f'/2$, where $f'=mf$;
  b. means for coupling said timing signals to said storage devices;
  c. means for alternately loading said analog signal into said first and second devices at the frequency $f'$; and
  d. means for alternately unloading said analog signal from said first and second storage devices at the frequency $f'/2$, one of said storage devices being loaded while the other storage device is being unloaded; and
means for coupling said unloaded signal to an output terminal.

12. The apparatus of claim 11 wherein each of said analog storage devices includes a charge coupled shift register.

13. The apparatus of claim 11 wherein said timing signal generating means includes first means for generating a signal indicative of the zero cross-over points of said analog signal, and second means synchronized to said zero cross-over signal for generating said timing signal having said frequency $f'$.

14. The apparatus of claim 13 wherein said first means includes a comparator having a zero voltage reference and said second means includes a phase locked loop responsive to said comparator to oscillate synchronously to said zero cross-over points.

15. The apparatus of claim 14 wherein said phase locked loop includes a feedback loop, and a divide-by-$m$ counter connected in said feedback loop, said phase locked loop generating said timing signal having said frequency $f'$.

16. The apparatus of claim 13 further including a divide-by-two circuit connected to said second means to provide said second timing signal.

17. An apparatus for expanding the time base by an integer factor of $n$, $n > 1$, of a substantially repetitive analog signal, said signal having a frequency $f$ and susceptible of random frequency variations comprising:
an input terminal for receiving said signal;
$n$ analog shift register devices, each of said devices having $m$ stages;
means for loading and unloading said devices with only integral cycles of said signal, including:
  a. means synchronized to a recurring portion of said analog signal for generating first and second timing signals of frequencies $f'$ and $f'/n$, respectively, where $f' = mf$;
  b. means for coupling said timing signals to said registers;
  c. means responsive to said first timing signal for loading $m$ samples of each cycle of said analog signal into said registers;
  d. means responsive to said second timing signal for unloading samples of said analog signal from said registers;
  one of the registers being unloaded while the remaining registers are being loaded; and
  e. means for sequencing said unloading means among said registers; and
means for coupling said unloaded signal to an output terminal.

18. The apparatus of claim 17 wherein said means for generating timing signals includes a phase locked loop synchronized to said analog signal, said phase locked loop including a divide-by-$m$ counter and generating said first timing signal having the frequency $f' = mf$.

19. The apparatus of claim 18 wherein said phase locked loop includes a phase detector and a voltage controlled oscillator, said phase detector producing a pulse having a duration proportional to the absolute time basis error between said analog signal and the output of said oscillator; and an antilog amplifier connected between said phase detector and said controlled oscillator to apply a control voltage to said oscillator which is a function of a percentage frequency error between said analog and oscillator signals.

20. The apparatus of claim 17 wherein said means for generating timing signals includes a fixed frequency oscillator and a square wave generator synchronized to the zero cross-over points of said analog signal to generate a square wave having a period equal to the period of a cycle of said analog signal; a gate connected to said oscillator and said generator for generating a pulse train having a number of pulses corresponding to the period of said square wave; means for converting said pulse train into a voltage proportional to said number of pulses; and a voltage controlled oscillator connected to said converting means for generating said timing signals.

21. The apparatus of claim 20 wherein said converting means includes a ripple counter.

22. An apparatus for compressing the time base of an analog signal, by an integer factor of $n$, $n > 1$, said analog signal having a frequency $f$ and susceptible of random frequency variations comprising:
an input terminal for receiving said signal;
$n$-analog shift registers each having $m$ stages and each including a feedback path for recirculating stored signals;
means for loading and unloading said registers with only whole cycles of said signal including:
  a. means synchronized to a recurring portion of said analog signal for generating first and second timing signals of frequencies $f'$ and $f'/n$, respectively, where $f' = mf$;
  b. means for coupling said timing signals to said analog shift registers;
  c. means responsive to said second timing signal for serially loading $m$ samples of each whole cycle of said analog signal into said shift registers;
  d. means responsive to said first timing signal for serially unloading said analog signal samples from said analog shift registers, said whole cycles of said loaded analog signal recirculating $n$ times in each analog shift register before being unloaded, one of said analog shift registers being unloaded while the remaining analog shift registers are being loaded; and
  e. means for sequencing said unloading means among said analog shift registers; and
means for coupling said unloaded analog signal to an output terminal.

23. The apparatus of claim 22 wherein said analog shift registers are charge coupled shift registers.

24. The apparatus of claim 23 further including amplifier means connected in the feedback circuit of each charge coupled shift register to compensate for leakage of the stored analog signal during recirculation.

25. Apparatus for changing the time base of an analog signal susceptible to random frequency variations comprising: analog shift register means;
   means for loading and unloading said registers with only integral cycles of said signal, including:
   a. means responsive to a same integral number of analog samples of the signal during each integral cycle of the signal;
   b. means for serially shifting analog replicas of the derived analog samples into the shift register means at a rate that is a first integral factor of the sampling rate; and
   c. means for serially shifting the analog replica out of the shift register means at a rate that is a second integral factor of the sampling rate, one of said first or second factors being an integral multiple, greater than one, of the other factor.

26. Apparatus for processisng an input analog signal having a frequency $f$ comprising:
   analog shift register means having $m$ stages, where $m$ is an integer greater than one;
   means for loading and unloading said register means with only integral cycles of said signal, including:
   a. means synchronized to a recurring portion of said input signal for generating a frequency reference signal;
   b. phase locked loop means responsive to said reference signal for generating a timing signal having a frequency $nf$, where $n$ is an integer greater than one;
   c. means responsive to said timing signal for serially loading said input signal into said analog shift register means; and
   d. means for unloading said analog shift register means.

27. The apparatus of claim 26 wherein $n = m$ whereby a single cycle of said input signal is loaded into said analog shift register means.

28. The apparatus of claim 26 wherein said phase locked loop means includes a divide-by-$m$ divider circuit in a feedback path of said phase locked loop means.

* * * * *